(12) United States Patent
Yang et al.

(10) Patent No.: US 8,635,929 B2
(45) Date of Patent: Jan. 28, 2014

(54) ROBOT JOINT DRIVING APPARATUS, ROBOT HAVING THE SAME AND CABLE LINKAGE METHOD OF ROBOT JOINT DRIVING APPARATUS

(75) Inventors: Soo Sang Yang, Suwon-si (KR); Youn Baek Lee, Suwon-si (KR); Hyun Sik Sim, Seongnam-si (KR); Yeon Taek Oh, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 318 days.

(21) Appl. No.: 12/987,244

(22) Filed: Jan. 10, 2011

(65) Prior Publication Data

US 2011/0167945 A1 Jul. 14, 2011

(30) Foreign Application Priority Data

Jan. 14, 2010 (KR) ................. 10-2010-0003518

(51) Int. Cl.
*F16H 9/04* (2006.01)
(52) U.S. Cl.
USPC .......... 74/490.04; 901/21; 474/253; 474/255; 474/257
(58) Field of Classification Search
USPC ............... 74/490.01–490.06, 37, 108, 89.22; 901/14–29, 38
See application file for complete search history.

(56) References Cited

U.S. PATENT DOCUMENTS

| | | | | |
|---|---|---|---|---|
| 640,242 A * | 1/1900 | Turner et al. | ................. | 91/358 R |
| 2,660,894 A * | 12/1953 | McClelland | ................. | 74/89.22 |
| 3,202,000 A * | 8/1965 | Fischer | ................. | 74/89.22 |
| 3,466,937 A * | 9/1969 | Motis | ................. | 74/89.22 |
| 3,745,888 A * | 7/1973 | Boretti | ................. | 92/9 |
| 4,084,267 A * | 4/1978 | Zadina | ................. | 623/24 |
| 4,266,992 A * | 5/1981 | Agaisse | ................. | 156/49 |
| 4,697,472 A * | 10/1987 | Hiyane | ................. | 74/490.02 |
| 4,804,220 A * | 2/1989 | Rosheim | ................. | 294/111 |
| 5,035,171 A * | 7/1991 | Gottling et al. | ................. | 92/137 |
| 5,447,403 A * | 9/1995 | Engler, Jr. | ................. | 414/4 |
| 5,710,870 A * | 1/1998 | Ohm et al. | ................. | 700/263 |
| 6,266,844 B1 * | 7/2001 | Conflitti et al. | ................. | 15/250.25 |
| 7,191,696 B2 * | 3/2007 | Morr et al. | ................. | 92/137 |
| 7,389,974 B2 * | 6/2008 | Garrec | ................. | 254/394 |
| 7,574,939 B2 * | 8/2009 | Garrec | ................. | 74/490.03 |
| 7,574,942 B2 * | 8/2009 | Miyazaki | ................. | 74/500.5 |
| 8,052,185 B2 * | 11/2011 | Madhani | ................. | 294/106 |
| 8,342,586 B2 * | 1/2013 | Sim | ................. | 294/106 |
| 2002/0078778 A1 * | 6/2002 | Grover et al. | ................. | 74/490.03 |
| 2003/0089576 A1 * | 5/2003 | Peter | ................. | 192/219.5 |
| 2003/0159535 A1 * | 8/2003 | Grover et al. | ................. | 74/490.04 |
| 2006/0169086 A1 * | 8/2006 | Garrec | ................. | 74/490.04 |
| 2009/0148263 A1 * | 6/2009 | Lee et al. | ................. | 414/735 |
| 2010/0011901 A1 * | 1/2010 | Burbank | ................. | 74/490.06 |
| 2010/0170361 A1 * | 7/2010 | Bennett et al. | ................. | 74/490.04 |

* cited by examiner

*Primary Examiner* — Troy Chambers
*Assistant Examiner* — Valentin Craciun
(74) *Attorney, Agent, or Firm* — Staas & Halsey LLP (57) ABSTRACT

A robot joint driving apparatus has an improved structure, a robot having the same, and a cable linkage method of the robot joint driving apparatus. In the robot joint driving apparatus, lines of a cable to drive a robot joint unit are connected plural times in parallel, thereby increasing torsional stiffness of the robot joint unit. Further, a cable fixing unit is provided on an output pulley, thereby preventing slippage of the cable on the output pulley. Moreover, the overall size of the robot joint driving apparatus is reduced due to an improved power transmission structure from a driving motor to the output pulley.

10 Claims, 12 Drawing Sheets

ROBOT JOINT DRIVING APPARATUS, ROBOT HAVING THE SAME AND CABLE LINKAGE METHOD OF ROBOT JOINT DRIVING APPARATUS

CROSS-REFERENCE TO RELATED APPLICATIONS

This application claims the priority benefit of Korean Patent Application No. 10-2010-0003518, filed on Jan. 14, 2010 in the Korean Intellectual Property Office, the disclosure of which is incorporated herein by reference.

BACKGROUND

1. Field

Embodiments relate to a robot joint driving apparatus which reinforces torsional stiffness of a robot joint unit, a robot having the same, and a cable linkage method of the robot joint driving apparatus.

2. Description of the Related Art

Robots of various types for household, military, and industrial purposes, such as a bipedal walking robot and a quadrupedal walking robot, have been developed.

Particularly, a humanoid robot is a robot which has a structure similar to a body structure of a human to perform motions similar to those of the human.

Such a humanoid robot performs various motions as well as walking motions, such as running and walking, through movements of joints similar to those of the human.

Robot joint driving methods are divided into a robot joint driving method using a motor and a reducer connected to the motor, and a robot joint driving method using a cable.

SUMMARY

Therefore, it is an aspect to provide a robot joint driving apparatus having an improved structure, a robot having the same, and a cable linkage method of the robot joint driving apparatus.

It is another aspect to provide a robot joint driving apparatus which reinforces torsional stiffness of a robot joint unit, a robot having the same, and a cable linkage method of the robot joint driving apparatus.

It is another aspect to provide a robot joint driving apparatus which prevents slippage on an output pulley, a robot having the same, and a cable linkage method of the robot joint driving apparatus.

It is a further aspect to provide a robot joint driving apparatus having a small size, a robot having the same, and a cable linkage method of the robot joint driving apparatus.

Additional aspects of the invention will be set forth in part in the description which follows and, in part, will be obvious from the description, or may be learned by practice of the invention.

In accordance with one aspect, a robot joint driving apparatus includes a driving motor rotated in regular and reverse directions, a movable member moving rectilinearly through driving force transmitted from the driving motor, a cable connected to the movable member in both directions, an idle pulley contacting one side of the cable and rotated, and an output pulley contacting the other side of the cable and rotated to directly drive a joint unit, wherein lines of the cable are connected at least once in parallel among the idle pulley, the movable member, and the output pulley.

The cable may form a closed loop, and both ends of the cable may be connected by a connection loop sleeve pressing the cable.

The cable may include a first line at one side thereof provided between the output pulley and the idle pulley, a second line provided at the side of the first line in parallel with the first line, a third line provided at the side of the second line in parallel with the second line, and a fourth line provided at the side of the third line in parallel with the third line.

The output pulley may include a cable fixing unit to prevent slippage of the cable on the output pulley.

The cable fixing unit may include cable guide brackets to guide the cable to enable the cable to be arranged in parallel with the axial direction of the output pulley.

Fixing loop sleeves pressing the cable may be inserted into parts of the cable contacting the output pulley, and the cable fixing unit may include spacers to fix the fixing loop sleeves to the output pulley.

The robot joint driving apparatus may further include a ball screw unit to which the movable member is screw-connected.

The robot joint driving apparatus may further include a ball screw unit frame to which the ball screw unit is connected, and the ball screw unit frame may include a guide slot to guide the movable member to prevent rotation of the movable member.

The movable member may include at least one guide bearing movably inserted into the guide slot.

The movable member may include mounting blocks, to which the cable is connected, forming a body of the movable member, and the mounting blocks may include cable connection parts provided to enable the cable to be connected thereto.

The cable connection parts may include first guide pins connected to the mounting blocks such that the lines of the cable are connected to the first guide pins in parallel, and second guide pins connected to the mounting blocks such that intervals between the lines of the cable are reduced.

In accordance with a further aspect, in a robot having a joint driving apparatus to drive a joint unit of the robot, the joint driving apparatus includes a driving motor rotated in regular and reverse directions, a movable member moving rectilinearly through driving force transmitted from the driving motor, a cable connected to the movable member in both directions, an idle pulley contacting one side of the cable and rotated, and an output pulley contacting the other side of the cable and rotated to directly drive a joint unit, wherein lines of the cable are connected at least once in parallel to increase torsional stiffness of the joint unit.

In accordance with another aspect, a cable linkage method of a robot joint driving apparatus, which has a movable member moving rectilinearly, a cable connected to the movable member in both directions, an idle pulley contacting one side of the cable and rotated, and an output pulley contacting the other side of the cable and rotated to directly drive a joint unit, includes connecting both ends of the cable with a connection loop sleeve to form a closed loop of the cable, and connecting lines of the cable at least once in parallel among the idle pulley, the movable member, and the output pulley.

The cable linkage method may further include arranging the cable in parallel with the axial direction of the output pulley to prevent slippage of the cable on the output pulley.

The cable linkage method may further include inserting fixing loop sleeves pressing the cable into parts of the cable contacting the output pulley, and fixing the fixing loop sleeves to the output pulley using pretension of the cable.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to like elements throughout.

Figure 1:
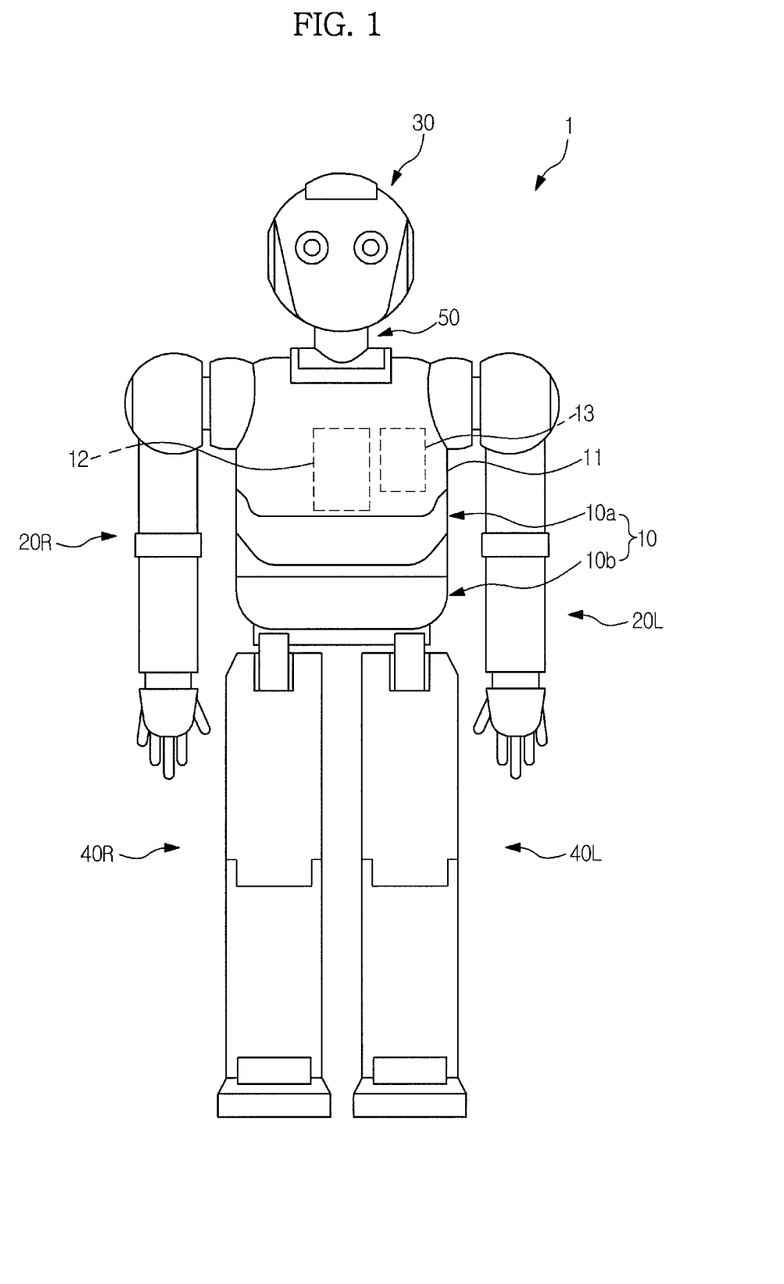
FIG. 1 is a front view illustrating an external appearance of a humanoid robot in accordance with one embodiment.
Figure 2:
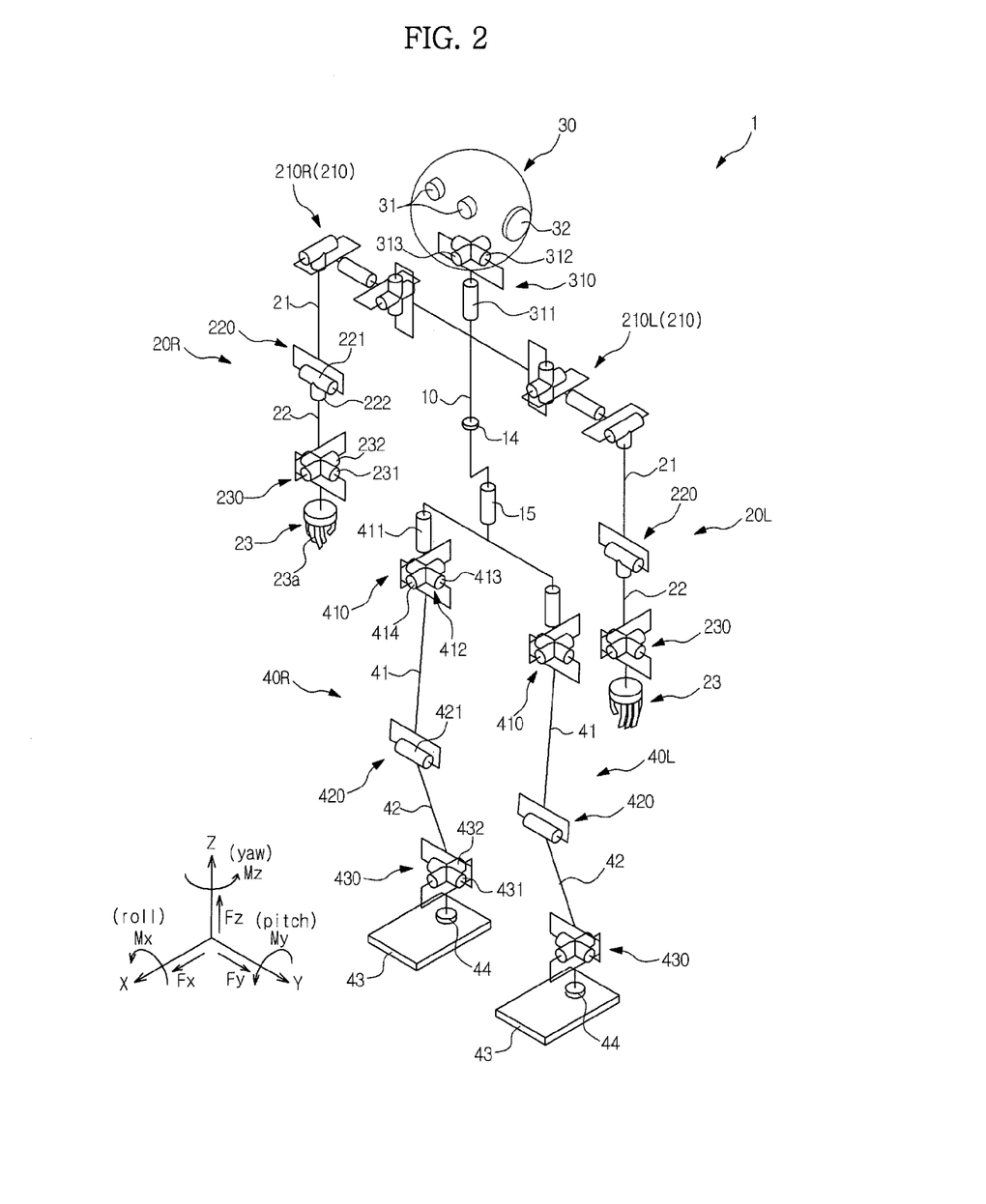
FIG. 2 is a perspective view schematically illustrating a configuration of the humanoid robot of FIG. 1.

FIG. 1 is a front view illustrating an external appearance of a humanoid robot in accordance with one embodiment, and FIG. 2 is a perspective view schematically illustrating a configuration of the humanoid robot of FIG. 1.

As shown in FIGS. 1 and 2, a humanoid robot 1 (hereinafter, simply referred to as a "robot") in accordance with this embodiment includes a torso 10, two arms 20R and 20L connected to right side and left side of the upper part of the torso 10, respectively, a head 30 connected to the upper end of the torso 10, and legs 40R and 40L connected to right side and left side of the lower part of the torso 10. The two arms 20R and 20L are connected to the torso 10 through shoulder joint assemblies 210R and 210L, and the head 30 is connected to the torso 10 through a neck 50. Here, "R" represents the right side of the robot 1 and "L" represents the left side of the robot 1.

The inside of the torso 10 is protected by a cover 11. A control unit 12, a battery 13, and a tilt sensor 14 may be installed on the torso 10. The tilt sensor 14 detects a tilt angle of the torso 10 relative to a vertical axis and an angular velocity thereof.

The torso 10 is divided into a breast part 10a and a waist part 10b, and a joint 15 allowing the breast part 10a to be rotated relative to the waist part 10b is installed between the breast part 10a and the waist part 10b. FIG. 2 briefly illustrates a torso link as the torso 10.

Each of the two arms 20R and 20L includes an upper arm link 21, a lower arm link 22, and a hand 23. The upper arm links 21 of the two arms 20R and 20L are connected to the torso 10 through the shoulder joint assemblies 210R and 210L. The upper arm links 21 and the lower arm links 22 of the two arms 20R and 20L are connected through elbow joint units 220, and the lower arm links 22 and the hands 23 of the two arms 20R and 20L are connected through wrist joint units 230.

Each of the elbow joint units 220 includes a rotating joint 221 in the pitch direction and a rotating joint 222 in the yaw direction, and thus may have 2 degrees of freedom (DOFs). Each of the wrist joint units 230 includes a rotating joint 231 in the pitch direction and a rotating joint 232 in the roll direction, and thus has 2 DOFs.

The hands 23 includes five fingers 23a. A plurality of joints (not shown) driven by motors is installed on each of the five fingers 23a. The five fingers 23a perform various motions, such as gripping of an object or pointing a designated direction, in connection with movement of the two arms 20R and 20L.

The shoulder joint assemblies 210R and 210L are mounted on both sides of the torso 10, thus connecting the two arms 20R and 20L to the torso 10. The two shoulder joint assemblies 210R and 210L are arranged between the torso 10 and the two arms 20R and 20L of the robot 1, and move the two arms 20R and 20L.

Cameras 31 functioning as sense of sight of the robot 1 and microphones 32 functioning as sense of hearing of the robot 1 may be installed on the head 30.

The head 30 is connected to the torso 10 though a neck joint unit 310. The neck joint unit 310 includes a rotating joint 311 in the yaw direction, a rotating joint 312 in the pitch direction, and a rotating joint 313 in the roll direction, and thus may have 3 DOFs.

A head rotating motor (not shown) is connected to each of the rotating joints 311, 312, and 313 of the neck joint unit 310. The control unit 12 controls the respective motors to drive the rotating joints 311, 312, and 313 at proper angles, thereby moving the head 30 in a desired direction.

Each of the two legs 40R and 40L includes a thigh link 41, a calf link 42, and a foot 43. The thigh links 41 of the two legs 40R and 40L are connected to the torso 10 through thigh joint units 410. The thigh links 41 and the calf links 42 of the two legs 40R and 40L are connected through knee joint units 420, and the calf links 42 and the feet 43 of the two legs 40R and 40L are connected through ankle joint units 430.

Each of the thigh joint units 410 may have 3 DOFs. In detail, each of the thigh joint units 410 includes a rotating joint 411 in the yaw direction (i.e., rotated around the Z-axis), a rotating joint 413 in the pitch direction (i.e., rotated around the Y-axis), and a rotating joint 414 in the roll direction (i.e., rotated in the X-axis). In the thigh joint unit 410, the rotating joint 413 in the pitch direction and the rotating joint 414 in the roll direction may form a hip joint unit 412.

Each of the knee joint units 420 includes a rotating joint 421 in the pitch direction, and may have a 1 DOF. Each of the ankle joint units 430 includes a rotating joint 431 in the pitch direction and a rotating joint 432 in the roll direction, and thus may have 2 DOFs.

As described above, the six rotating joints of the three joint units are provided in each of the two legs 40R and 40L, and thus a total of twelve rotating joints are provided in the two legs 40R and 40L. Although not shown in the drawings, motors to respectively drive the rotating joints are installed on each of the two legs 40R and 40L. The control unit 12 properly controls the respective motors provided on the two legs 40R and 40L, thereby achieving various motions of the two legs 40R and 40L including walking of the robot 1.

A multi-axis force and torque (F/T) sensor 44 is installed between the foot 43 and the ankle joint unit 430 of each of the two legs 40R and 40L. The multi-axis F/T sensors 44 measures three-directional components (Mx, My, Mz) of moment and three-directional components (Fx, Fy, Fz) of force transmitted from the feet 43, thereby detecting whether or not the feet 43 are planted on the ground or load applied to the feet 43.

Hereinafter, a robot joint driving apparatus 500 used in at least one of the several joint units of the above robot will be described.

Figure 3:
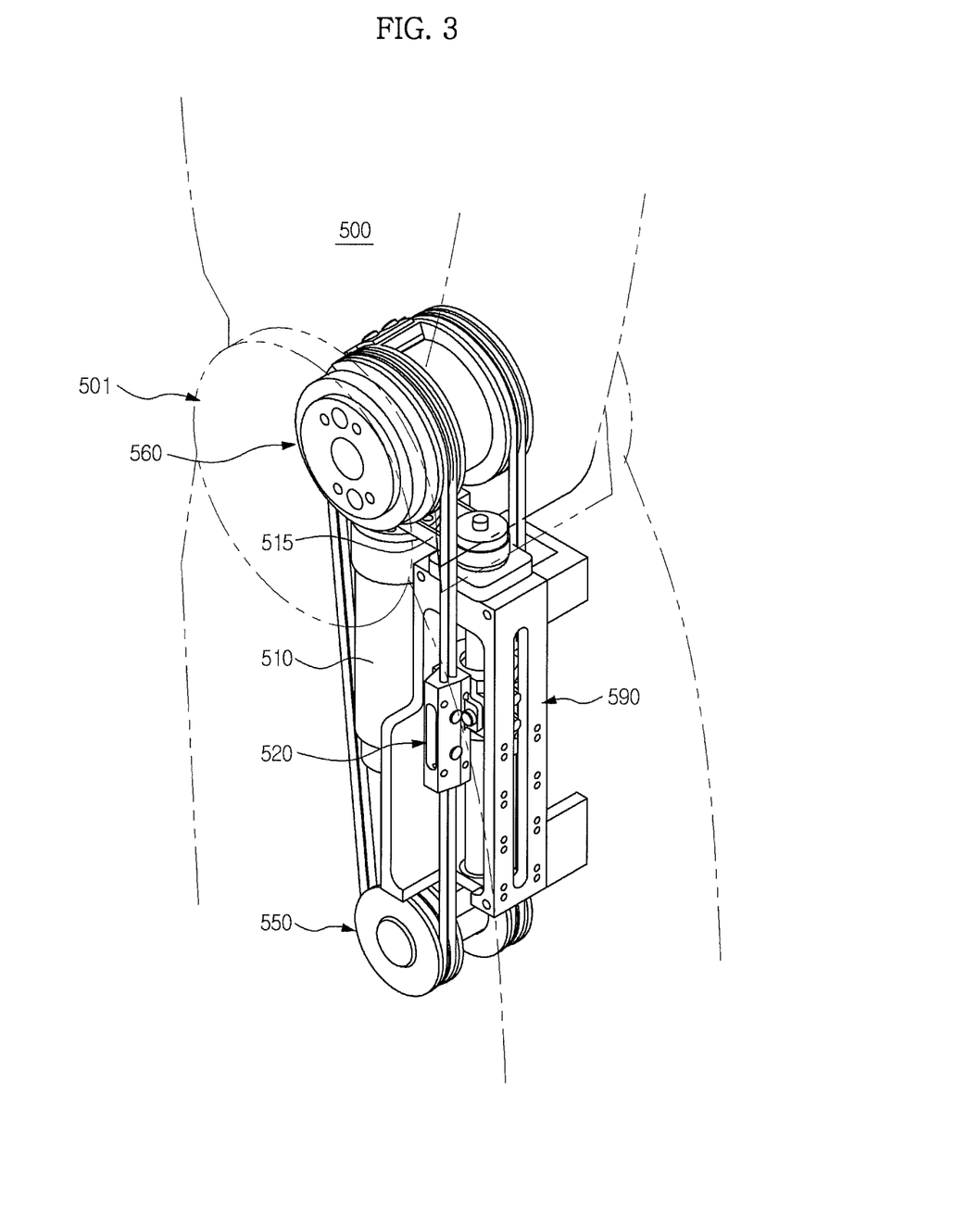
FIG. 3 is a perspective view illustrating an external appearance of a robot joint driving apparatus.
Figure 4:
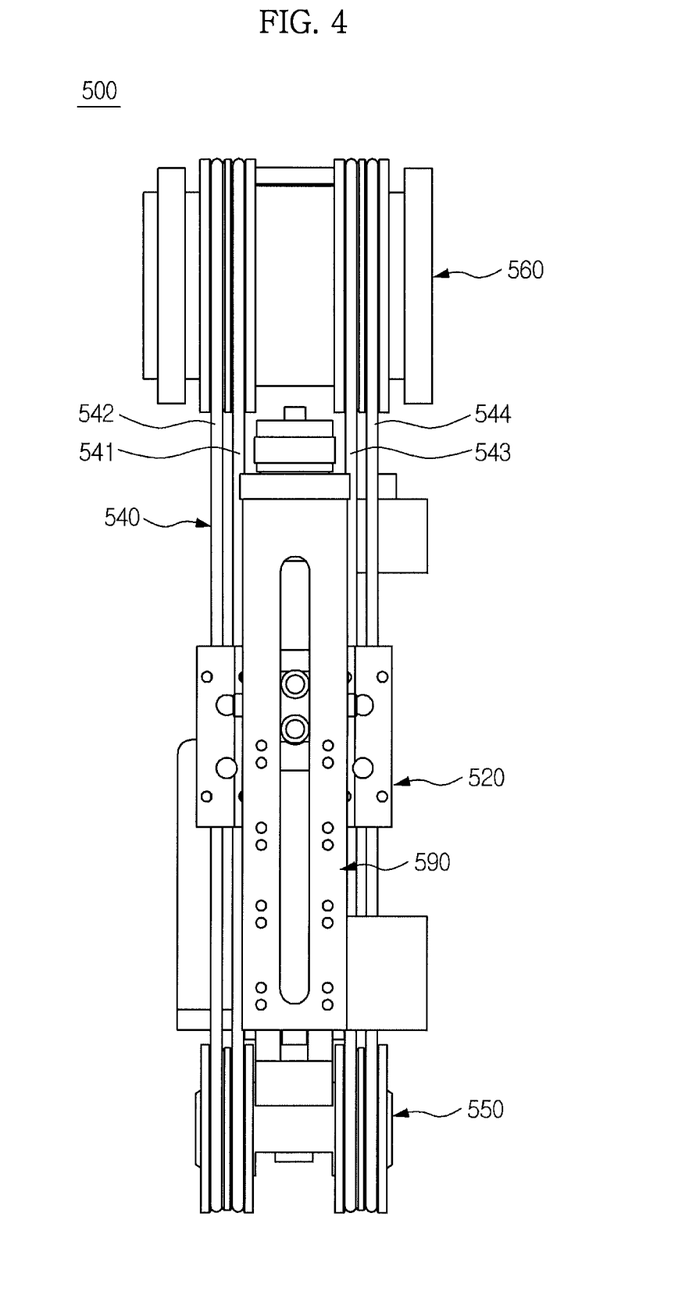
FIG. 4 is a front view of FIG. 3.
Figure 5:
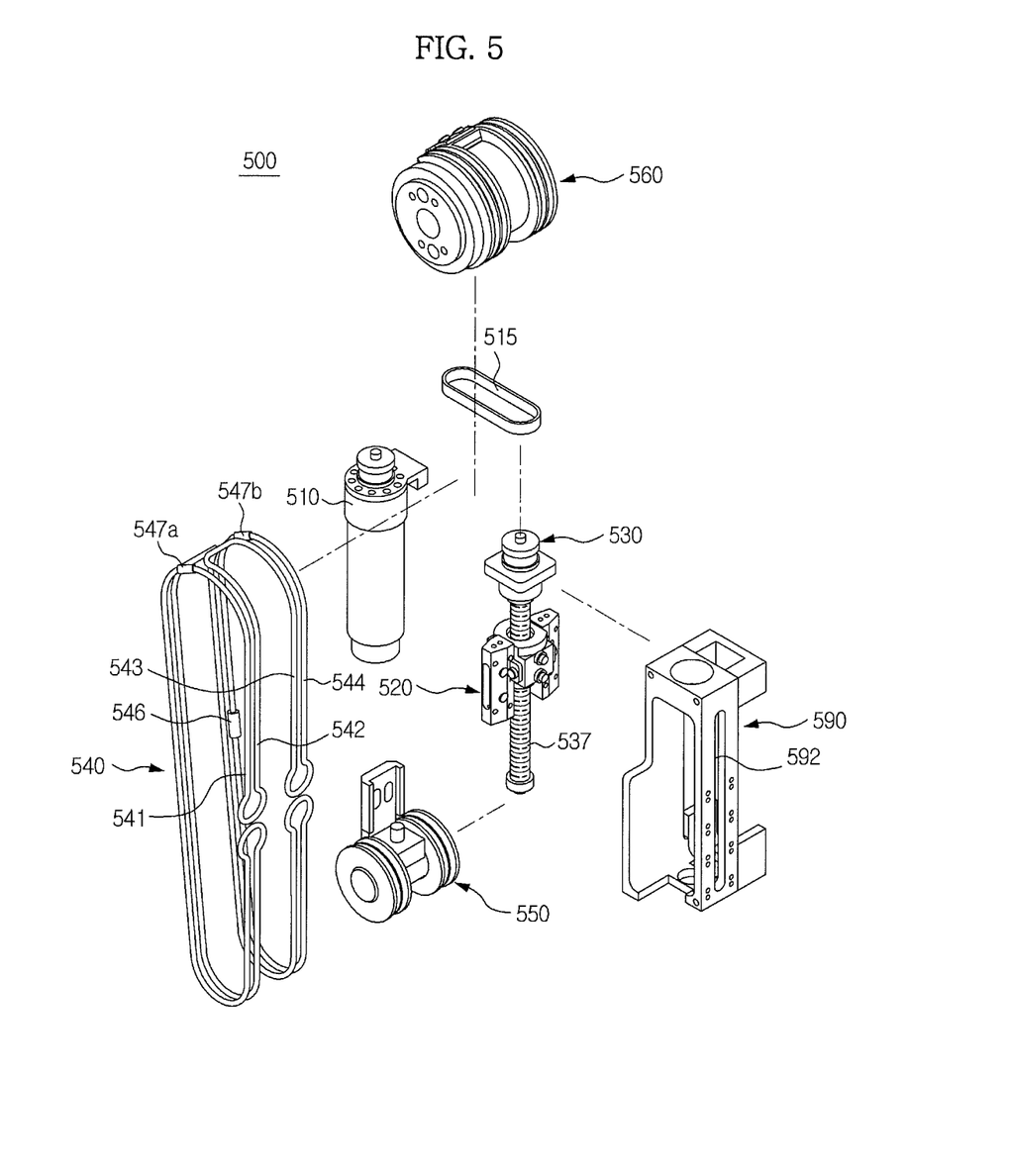
FIG. 5 is an exploded perspective of FIG. 3.

FIG. 3 is a perspective view illustrating an external appearance of a robot joint driving apparatus, FIG. 4 is a front view of FIG. 3, FIG. 5 is an exploded perspective of FIG. 3, FIGS.

Figure 6A:
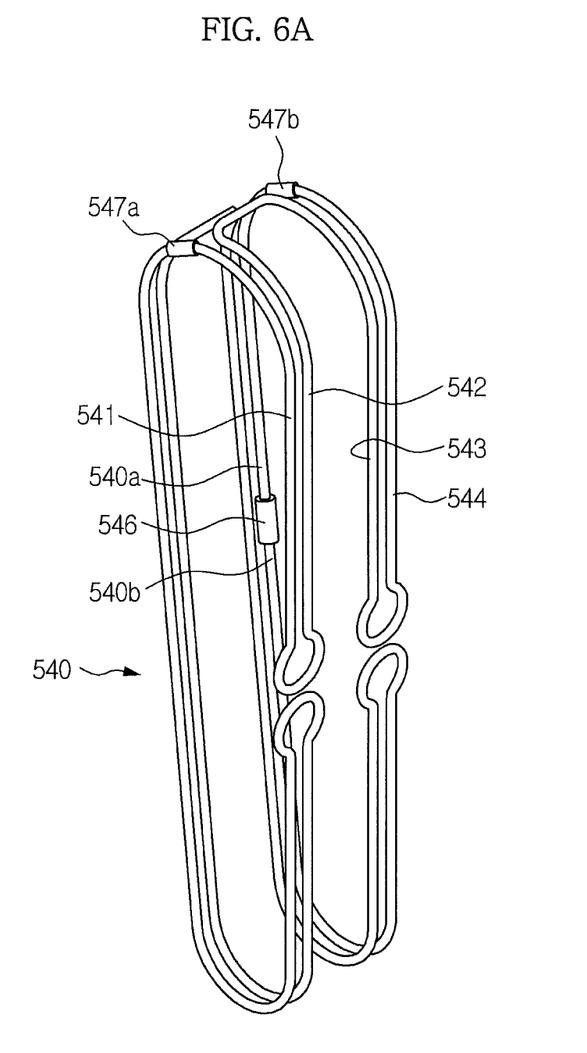
FIGS. 6A and 6B are views illustrating a connection state of a cable, seen in different directions.
Figure 6B:
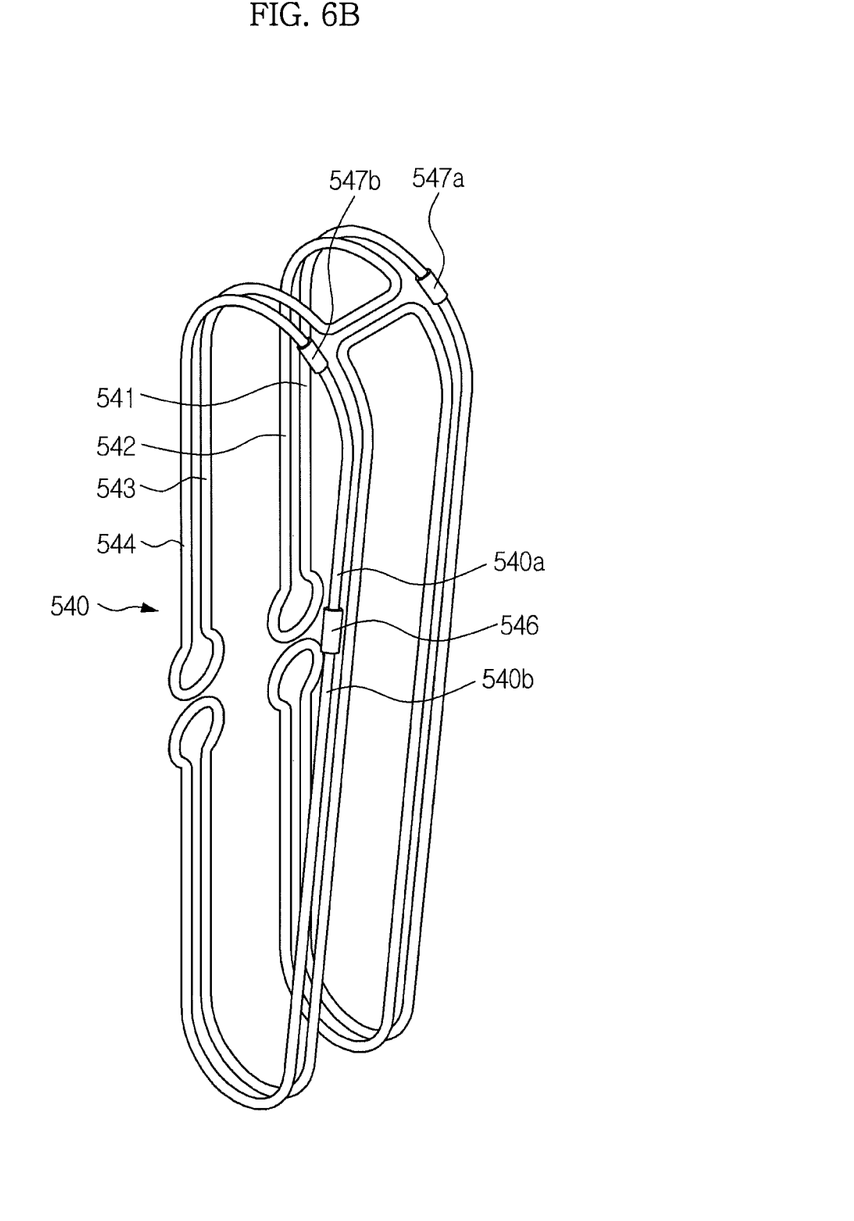
Figure 7:
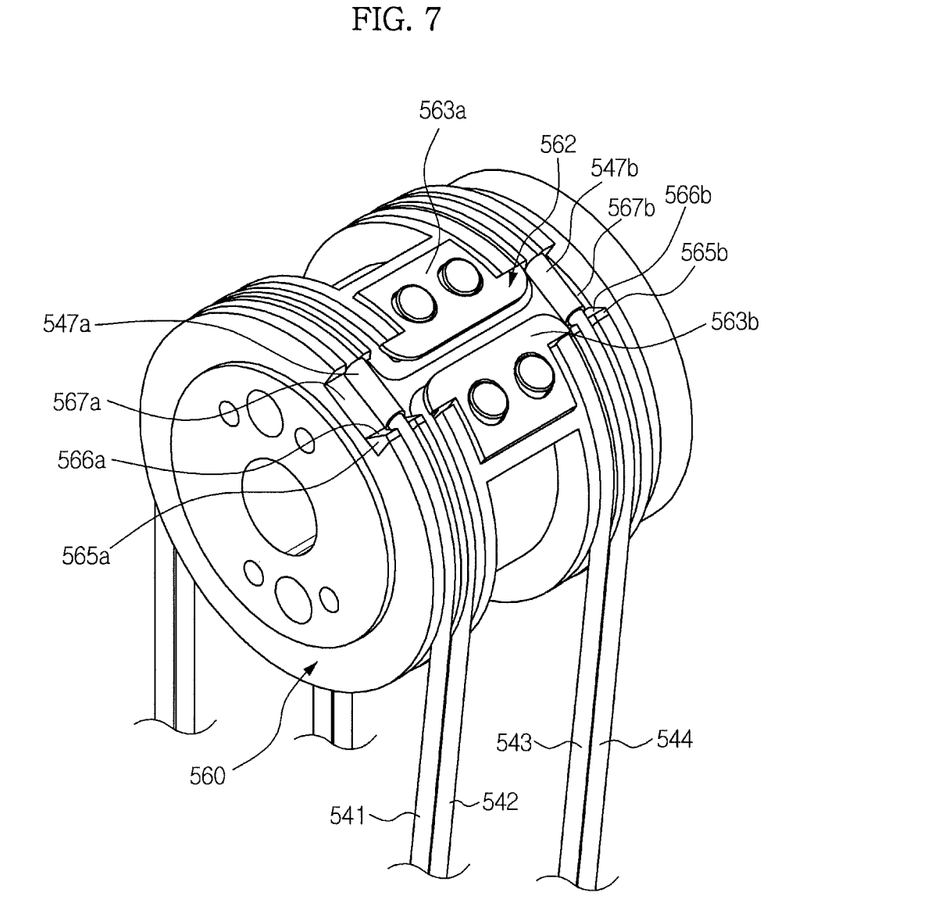
FIG. 7 is an enlarged perspective view of an output pulley.
Figure 8:
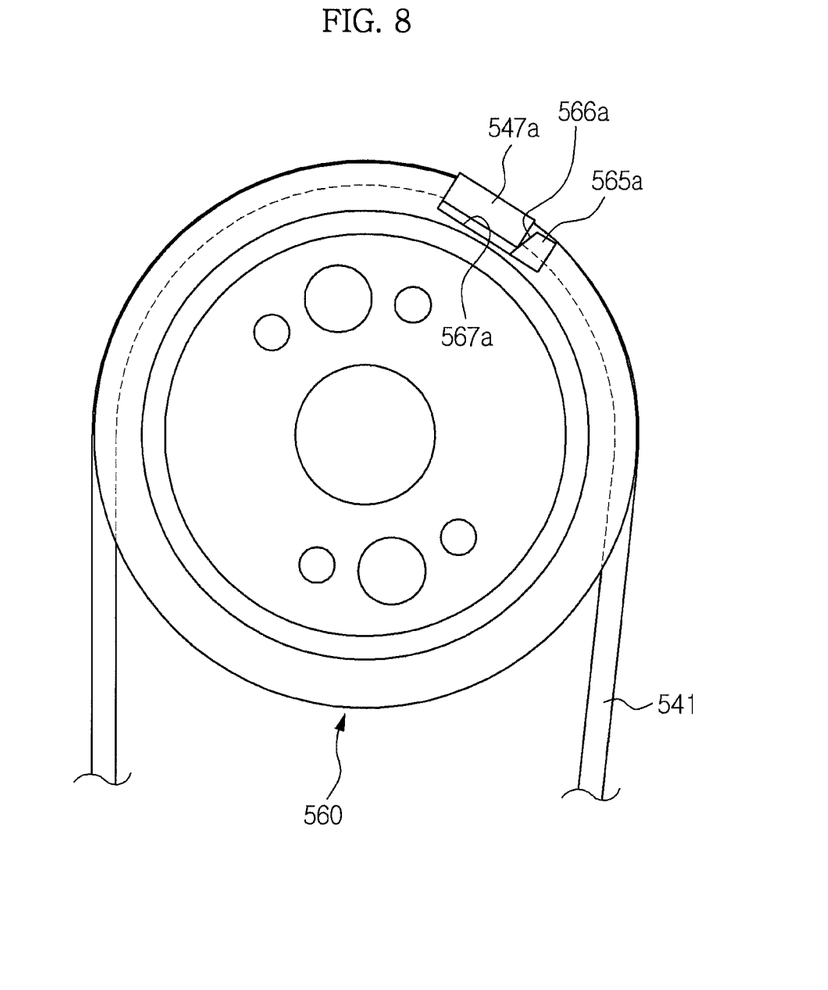
FIG. 8 is a side view of FIG. 7.
Figure 9:
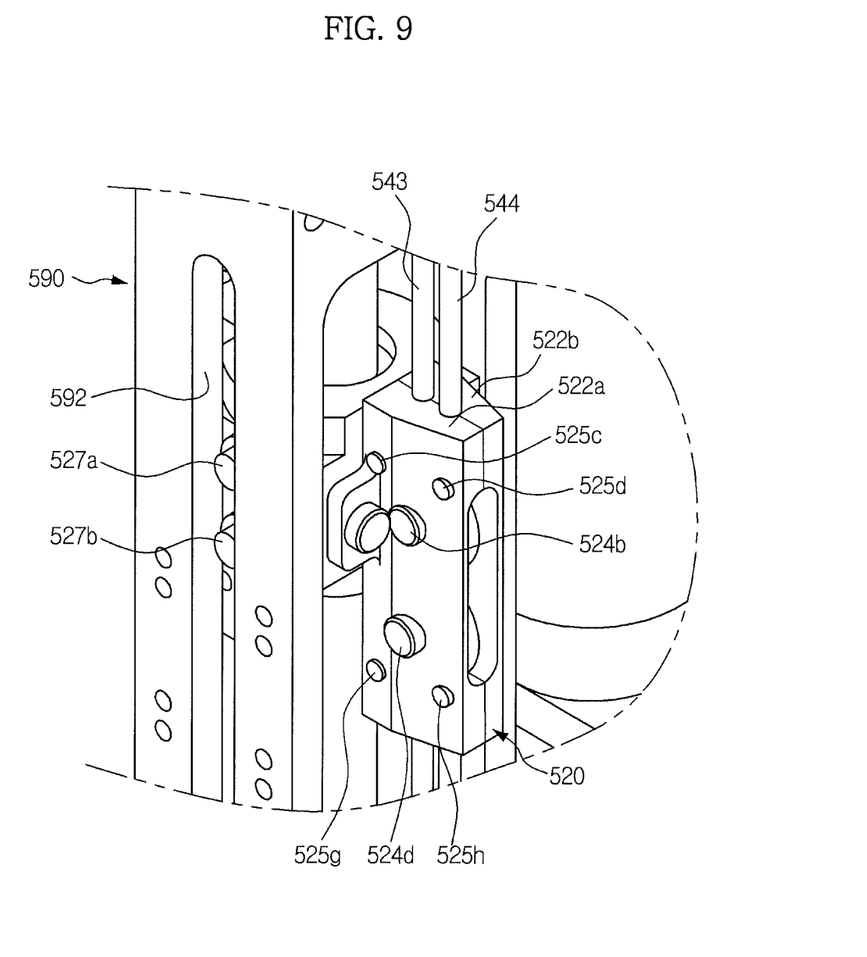
FIG. 9 is a view illustrating connection of a movable member and a ball screw unit frame.
Figure 10:
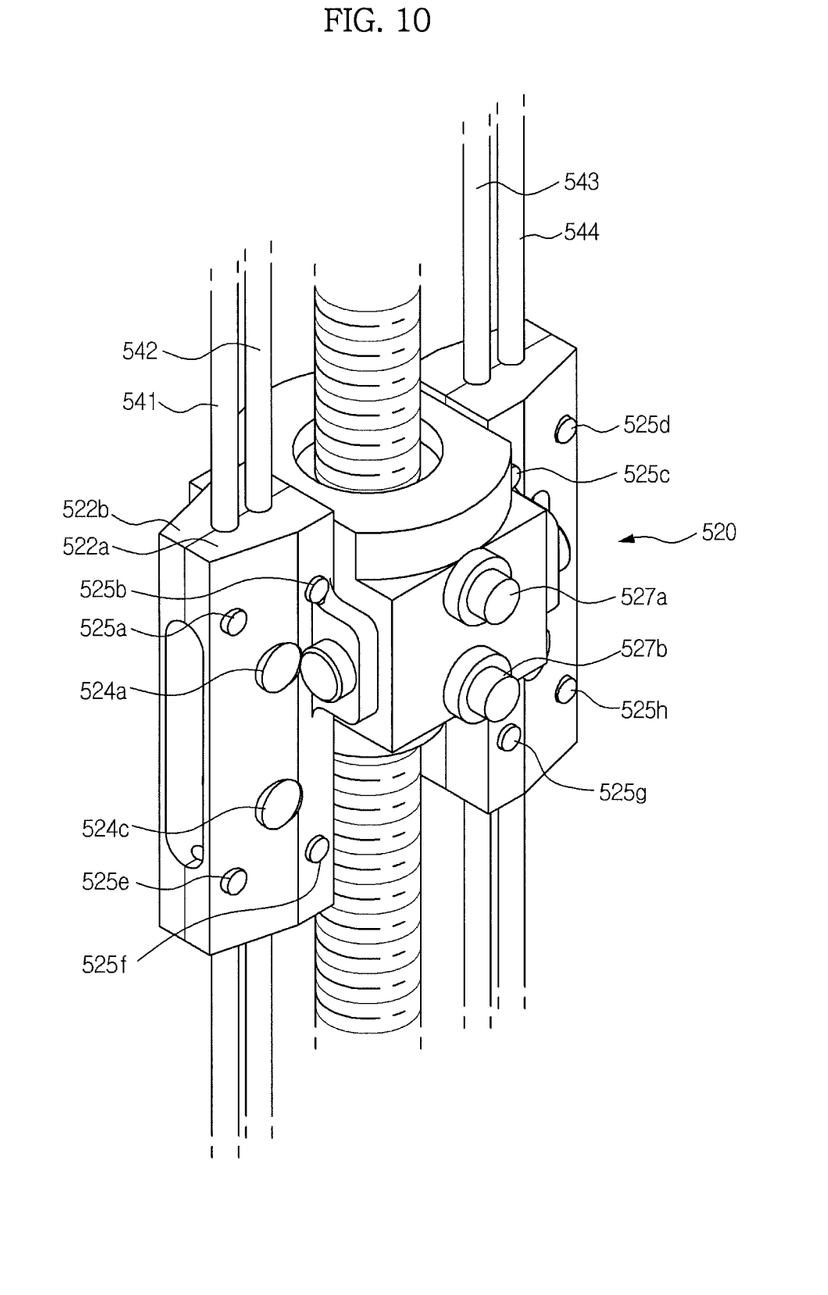
FIG. 10 is a view illustrating the movable member.
Figure 11:
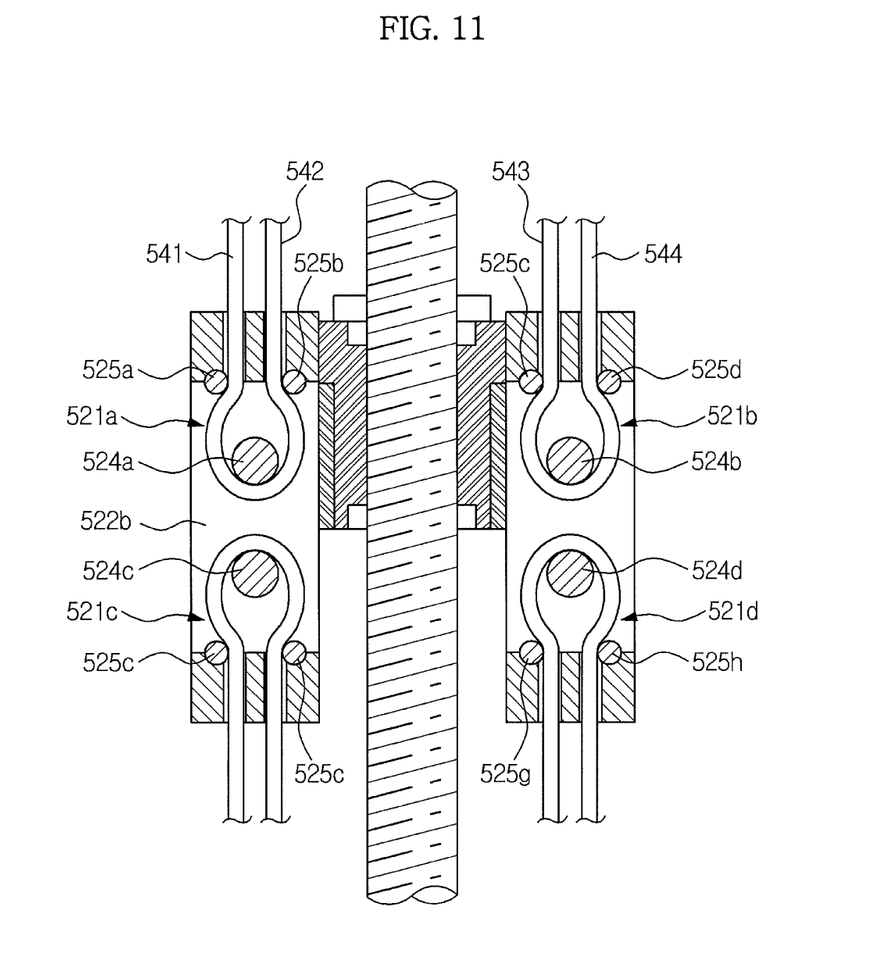
FIG. 11 is a view illustrating a connection state of a cable to the inside of the movable member.

6A and 6B are views illustrating a connection state of a cable, seen in different directions, FIG. 7 is an enlarged perspective view of an output pulley, FIG. 8 is a side view of FIG. 7, FIG. 9 is a view illustrating connection of a movable member and a ball screw unit frame, FIG. 10 is a view illustrating the movable member, and FIG. 11 is a view illustrating a connection state of a cable to the inside of the movable member.

As shown in FIGS. 3 to 5, the robot joint driving apparatus 500 includes a driving motor 510 rotated in regular and reverse directions, a movable member 520 moving rectilinearly through driving force transmitted from the driving motor 510, a ball screw unit 530 to which the movable member 520 is screw-connected, a cable 540 connected to the movable member 520 in both directions, an idle pulley 550 contacting one side of the cable 540 and rotated, and an output pulley 560 contacting the other side of the cable 540 and rotated to directly drive the joint unit 510.

The driving motor 510 provides driving force to drive the robot joint driving apparatus 500. One side of the driving motor 510 is connected to the ball screw unit 530 by a driving belt 515, and rotary force of the driving motor 510 is transmitted to the ball screw unit 530 through the driving belt 515 to rotate the ball screw unit 530.

The ball screw unit 530 is rotated by the driving motor 510, and includes a screw part 537 provided with a screw thread such that the movable member 520 is connected to the screw part 537.

When the ball screw unit 530 is rotated, the movable member 520 rectilinearly moves in the vertical direction along the screw part 537. That is, the rotation of the driving motor 510 in the regular or reverse direction is transmitted to the movable member 520, and thus is changed into vertical rectilinear movement.

The ball screw unit 530 to which the movable member 520 is connected is connected to a ball screw unit frame 590. The ball screw unit 530 within the ball screw unit frame 590 is rotated in the regular and reverse directions, and thereby the movable member 520 rectilinearly moves in the vertical direction.

The cable 540 is connected to both sides of the movable member 520 in the vertical direction. The cable 540 is connected to the output pulley 560 and the idle pulley 550 while maintaining designated tension to rotate the joint unit 501 using the driving force of the driving motor 510. The cable 540 may be made of steel, and is arranged to surround the output pulley 560 and the idle pulley 550. It is noted that the idle pulley 550 and the output pulley 560 may be a disc-shaped form.

Now, the overall operation of the robot joint driving apparatus 500 will be described. When the driving motor 510 is rotated in the regular or reverse direction, the ball screw unit 530 is rotated, and thus the movable member 520 rectilinearly moves in the vertical direction, thereby moving the cable 540 in the vertical direction. The movement of the cable 540 enables the output pulley 560 and the idle pulley 550 to be rotated, thereby enabling the joint unit 501 connected to the output pulley 560 to be rotated in a regular or reverse direction.

As shown in FIGS. 6A and 6B, one cable 540 is formed in a closed loop. In order to form the closed loop of the cable 540, both ends 540a and 540b of the cable 540 are connected by a connection loop sleeve 546 pressing the cable 540. That is, both ends 540a and 540b of the cable 540 are connected and fixed to each other by the connection loop sleeve 546.

Lines of the cable 540 are connected at least once in parallel among the idle pulley 550, the movable member 520, and the output pulley 560. In the embodiment, the cable 540 includes a first line 541 at one side thereof formed between the output pulley 560 and the idle pulley 550, a second line 542 formed at the side of the first line 541 in parallel with the first line 541, a third line 543 formed at the side of the second line 542 in parallel with the second line 542, and a fourth line 544 formed at the side of the third line 543 in parallel with the third line 543.

The connection of the lines of the cable 540 in parallel functions to increase torsional stiffness of the robot joint driving apparatus 500. The torsional stiffness expresses a degree of movement of the joint unit 501 against external force, if the external force is applied to the joint unit 501 in a stoppage state. High torsional stiffness means that the joint unit 501 exhibits less movement in response to applied external force.

As methods of increasing the torsional stiffness of the robot joint driving apparatus 500, increase of diameters of the output pulley 560 and the idle pulley 550 and decrease of a free length of the cable 540 may be considered. However, if the diameters of the output pulley 560 and the idle pulley 550 are increased, the overall size of the robot joint driving apparatus 500 is increased, and if the free length of the cable 540 is decreased, a length of the ball screw unit 535 is decreased and thus a movable angle of the joint unit 501 is reduced. In the embodiment, these problems are solved by connecting the lines of the cable 540 plural times in parallel. The above method of increasing the torsional stiffness of the robot joint driving apparatus 500 by connecting the lines of the cable 540 plural times in parallel has the same principle as that of increasing a spring constant by connecting plural springs in parallel.

As shown in FIGS. 7 and 8, the output pulley 560 includes a cable fixing unit 562 to prevent slippage of the cable 540.

The cable fixing unit 562 includes cable guide brackets 563a and 563b to guide the cable 540 to enable the cable 540 to be arranged in parallel with the axial direction of the output pulley 560. That is, parts of the cable 540 contacting the output pulley 560 and connecting the second line 542 and the third line 543 are arranged along grooves formed on the cable guide brackets 563a and 563b, and thus frictional force between the output pulley 560 and the cable 540 is increased.

The cable fixing unit 562 further includes spacers 565a and 565b to fix the cable 540 to the output pulley 560. Fixing loop sleeves 547a and 547b pressing the cable 540 are inserted into parts of the cable 540 at the first line 541 and the fourth line 544 contacting the output pulley 560, and the spacers 565a and 565b fix the fixing loop sleeves 547a and 547b to the output pulley 560. That is, the spacers 565a and 565b provided with inclined planes 566a and 566b are attached to designated sides of the loop sleeve grooves 567a and 567b of the output pulley 560 using an adhesive agent, and the fixing loop sleeves 547a and 547b contacting spacers 565a and 565b are inserted into the cable 540. Here, the fixing loop sleeves 547a and 547b are fixed to the loop sleeve grooves 567a and 567b due to pretension of the cable 540.

With reference to FIGS. 9 to 11, connecting relations between the movable member 520 and the ball screw unit frame 590 and connecting relations between the movable member 520 and the cable 540 will be described.

The ball screw unit frame 590 includes a guide slot 592 to guide the movable member 520 to prevent rotation of the movable member 520. The guide slot 592 is formed in the vertical direction, and thus serves to enable the movable member 520 to move only in the vertical direction and to prevent rotation of the movable member 520 due to rotation of the ball screw unit 535.

Guide bearings 527a and 527b formed on the front surface of the movable member 520 are movably inserted into the guide slot 592. Since the guide bearings 527a and 527b are formed integrally with the movable member 520, the movable member 520 also moves together with movement of the guide bearings 527a and 527b.

The movable member 520 includes mounting blocks 522a and 522b, to which the cable 540 is connected, forming a body of the movable member 520. The mounting blocks 522a and 522b are formed by connecting front mounting blocks 522a and rear mounting blocks 522b.

The mounting blocks 522a and 522b include cable connection parts 521a, 521b, 521c, and 521d provided such that the cable 540 are connected to the cable connection parts 521a, 521b, 521c, and 521d. The cable connection parts 521a, 521b, 521c, and 521d include first guide pins 524a, 524b, 524c, and 524d connected to the mounting blocks 522a and 522b, respectively, such that the cable 540 is connected to the cable connection parts 521a, 521b, 521c, and 521d in parallel, and second guide pins 525a, 525b, 525c, 525d, 525e, 525f, 525g, and 525h connected to the mounting blocks 522a and 522b such that intervals between the lines of the cable 540 are reduced.

The cable 540 is hung on the first guide pins 524a, 524b, 524c, and 524d and thus forms loop-shaped parts. Further, the intervals between the lines of the cable 540 connected in parallel are reduced by the second guide pins 525a, 525b, 525c, 525d, 525e, 525f, 525g, and 525h. Here, each of the first guide pins 524a, 524b, 524c, and 524d and the second guide pins 525a, 525b, 525c, 525d, 525e, 525f, 525g, and 525h has a circular cross section, and thus abrasion at parts thereof contacting the cable 540 is prevented and the curvature of the cable 540 is naturally formed. Further, when the cable 540 is connected to the mounting blocks 522a and 522b using the first guide pins 524a, 524b, 524c, and 524d and the second guide pins 525a, 525b, 525c, 525d, 525e, 525f, 525g, and 525h, the first line 541, the second line 542, the third line 543, and the fourth line 545 of the cable 540 connected in parallel are naturally formed.

Hereinafter, a cable linkage method of a robot joint driving apparatus 500 in accordance with one embodiment will be described.

The cable linkage method includes connecting both ends 540a and 540b of one cable 540 with the connection loop sleeve 546 to form the closed loop of the cable 540, and connecting lines of the cable 540 at least once in parallel among the idle pulley 550, the movable member 520, and the output pulley 560.

Thereafter, the cable linkage method further includes arranging the cable 540 in parallel with the axial direction of the output pulley 560 to prevent slippage of the cable 540 on the output pulley 560.

Finally, the cable linkage method further includes fixing the fixing loop sleeves 547a and 547b, inserted into the cable 540, to the output pulley 560 using pretension of the cable 540.

Through the above process, the cable 540 in which the first line 541, the second line 542, the third line 543, and the fourth line 544 are connected in parallel is provided.

In the above-described robot joint driving apparatus 500, the lines of the cable 540 are connected in parallel to increase torsional stiffness of the joint unit 501, and the cable fixing unit 562 is provided on the output pulley 560 to prevent slippage of the cable 540 on the output pulley 560.

Further, structures of the ball screw unit 535, the movable member 520, and the ball screw unit frame 590 are improved, thereby reducing manufacturing costs of the robot joint driving apparatus 500 and decreasing the overall size of the robot joint driving apparatus 500.

As is apparent from the above description, in a robot joint driving apparatus, a robot having the same, and a cable linkage method of the robot joint driving apparatus in accordance with one embodiment, lines of a cable are connected at least once in parallel among an idle pulley, a movable member, and an output pulley, thereby increasing torsional stiffness of a robot joint unit.

Further, the output pulley includes a cable fixing unit, thereby preventing slippage of the cable on the output pulley.

Moreover, the overall size of the robot joint driving apparatus is reduced due to an improved structure thereof.

Although a few embodiments have been shown and described, it would be appreciated by those skilled in the art that changes may be made in these embodiments without departing from the principles and spirit of embodiment, the scope of which is defined in the claims and their equivalents.

What is claimed is:

1. A robot joint driving apparatus comprising:
   a driving motor rotated in regular and reverse directions;
   a movable member to move rectilinearly through driving force transmitted from the driving motor;
   a cable assembly connected to the movable member in both directions;
   an idle pulley to contact one end of the cable assembly and rotated; and
   an output pulley to contact the other end of the cable assembly and rotated to directly drive a joint unit,
   wherein lines of the cable assembly are connected at least once in parallel among the idle pulley, the movable member, and the output pulley,
   wherein the cable assembly includes a first line at one side of the cable assembly provided between the output pulley and the idle pulley, a second line provided adjacent to the first line in parallel with the first line, a third line provided adjacent to the second line in parallel with the second line, and a fourth line provided adjacent to the third line in parallel with the third line.

2. The robot joint driving apparatus according to claim 1, wherein the cable assembly forms a closed loop, and both ends of the cable assembly are connected by a connection loop sleeve pressing the cable assembly.

3. The robot joint driving apparatus according to claim 1, wherein the output pulley includes a cable fixing unit to prevent slippage of the cable assembly on the output pulley.

4. The robot joint driving apparatus according to claim 3, wherein the cable fixing unit includes cable guide brackets to guide the cable assembly to enable the cable assembly to be arranged in parallel with the axial direction of the output pulley.

5. The robot joint driving apparatus according to claim 3, wherein fixing loop sleeves pressing the cable assembly are inserted into parts of the cable assembly contacting the output pulley, and the cable fixing unit includes spacers to fix the fixing loop sleeves to the output pulley.

6. The robot joint driving apparatus according to claim 1, further comprising a ball screw unit to which the movable member is screw-connected.

7. The robot joint driving apparatus according to claim 6, further comprising a ball screw unit frame to which the ball screw unit is connected,
   wherein the ball screw unit frame includes a guide slot to guide the movable member to prevent rotation of the movable member.

8. The robot joint driving apparatus according to claim 7, wherein the movable member includes at least one guide bearing movably inserted into the guide slot.

9. The robot joint driving apparatus according to claim 1, wherein the movable member includes mounting blocks, to which the cable assembly is connected, forming a body of the movable member, and the mounting blocks include cable connection parts provided to enable the cable assembly to be connected thereto.

10. The robot joint driving apparatus according to claim 9, wherein the cable connection parts include first guide pins connected to the mounting blocks such that the lines of the cable assembly are connected to the first guide pins in parallel, and second guide pins connected to the mounting blocks such that intervals between the lines of the cable assembly are reduced.

* * * * *